United States Patent
Tachibana et al.

(10) Patent No.: US 12,014,723 B2
(45) Date of Patent: Jun. 18, 2024

(54) INFORMATION PROCESSING METHOD, INFORMATION PROCESSING DEVICE, AND PROGRAM

(71) Applicant: Yamaha Corporation, Shizuoka (JP)

(72) Inventors: Makoto Tachibana, Shizuoka (JP); Motoki Ogasawara, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 734 days.

(21) Appl. No.: 17/119,426

(22) Filed: Dec. 11, 2020

(65) Prior Publication Data

US 2021/0097975 A1    Apr. 1, 2021

Related U.S. Application Data

(63) Continuation of application No. PCT/JP2019/022254, filed on Jun. 5, 2019.

(30) Foreign Application Priority Data

Jun. 15, 2018 (JP) .................. 2018-114606

(51) Int. Cl.
G10L 13/047 (2013.01)
G06T 11/20 (2006.01)

(52) U.S. Cl.
CPC ......... *G10L 13/047* (2013.01); *G06T 11/203* (2013.01)

(58) Field of Classification Search
CPC .............. G10L 13/047; G06T 11/203
See application file for complete search history.

(56) References Cited

U.S. PATENT DOCUMENTS

2014/0046667 A1* 2/2014 Yeom ............... G10L 13/033
704/258
2015/0040743 A1   2/2015 Tachibana

FOREIGN PATENT DOCUMENTS

| JP | 2012103654 A | 5/2012 |
| JP | 2013137520 A | 7/2013 |
| JP | 2015034920 A | 2/2015 |
| JP | 2015049253 A | 3/2015 |
| JP | 2017097176 A | 6/2017 |
| JP | 2017107228 A | 6/2017 |

OTHER PUBLICATIONS

International Search Report in PCT/JP2019/022254, dated Aug. 20, 2019.
An Office Action in the corresponding Japanese Patent Application No. 2020-525476, dated Dec. 24, 2021.

* cited by examiner

*Primary Examiner* — Mohammad K Islam
(74) *Attorney, Agent, or Firm* — Global IP Counselors, LLP

(57) ABSTRACT

An information processing method is realized by a computer and includes generating a first characteristic transition which is a transition of acoustic characteristics, in accordance with an instruction from a user, generating a second characteristic transition which is a transition of acoustic characteristics of voice that is pronounced in a specific pronunciation style selected from a plurality of pronunciation styles, and generating a combined characteristic transition which is a transition of the acoustic characteristics of synthesized voice by combining the first characteristic transition and the second characteristic transition.

18 Claims, 7 Drawing Sheets

INFORMATION PROCESSING METHOD, INFORMATION PROCESSING DEVICE, AND PROGRAM

CROSS-REFERENCE TO RELATED APPLICATIONS

This application is a continuation application of International Application No. PCT/JP2019/022254, filed on Jun. 5, 2019, which claims priority to Japanese Patent Application No. 2018-114606 filed in Japan on Jun. 15, 2018. The entire disclosures of International Application No. PCT/JP2019/022254 and Japanese Patent Application No. 2018-114606 are hereby incorporated herein by reference.

BACKGROUND

Technological Field

The present invention relates to a voice synthesis technology.

Background Information

Voice synthesis technology for synthesizing voice that pronounces a note designated by a user has been proposed in the known art. For example, Japanese Laid-Open Patent Application No. 2015-34920 discloses a technology in which the transition of the pitch that reflects the expression peculiar to a particular singer is set by means of a transition estimation model, such as HMM (Hidden Markov Model), to synthesize a singing voice that follows the transitions of pitch.

SUMMARY

In a voice synthesis scenario, it is important to be able to finely adjust the transition of acoustic characteristics such as the pitch in accordance with an instruction from a user.

An information processing method according to one aspect of the present disclosure comprises generating a first characteristic transition, which is a transition of acoustic characteristics, in accordance with an instruction from a user, generating a second characteristic transition, which is a transition of acoustic characteristics of voice that is pronounced in a specific pronunciation style selected from a plurality of pronunciation styles, and generating a combined characteristic transition, which is a transition of the acoustic characteristics of synthesized voice by combining the first characteristic transition and the second characteristic transition.

An information processing device according to one aspect of the present disclosure comprises an electronic controller includes at least one processor, and the electronic controller is configured to execute a plurality of modules including a first transition generation module that generates a first characteristic transition, which is a transition of acoustic characteristics, in accordance with an instruction from the user, a second transition generation module that generates a second characteristic transition, which is a transition of acoustic characteristics of voice that is pronounced in a specific pronunciation style, and a transition combination module that generates a combined characteristic transition, which is a transition of the acoustic characteristics of synthesized voice, by combining the first characteristic transition and the second characteristic transition.

DETAILED DESCRIPTION OF THE EMBODIMENTS

In a configuration in which a user directly edits the transition of the acoustic characteristic manually for the entire synthesized voice, there is the problem of high user workload. In consideration of such circumstances, an object of the present disclosure is to reduce the workload of adjusting the transition of the acoustic characteristics of synthesized voice. Selected embodiments to solve the problem will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

First Embodiment

Figure 1:
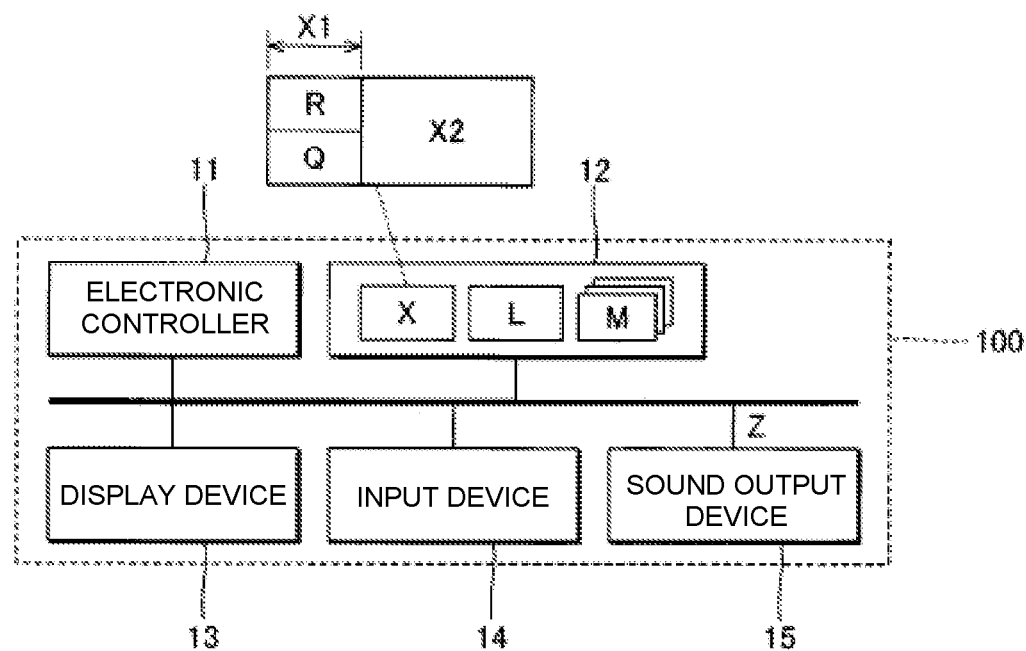
FIG. 1 is a block diagram illustrating a configuration of an information processing device according to a first embodiment.

FIG. 1 is a block diagram illustrating a configuration of an information processing device 100 according to a first embodiment. The information processing device 100 is a voice synthesizing device that generates voice (hereinafter referred to as "synthesized voice") in which a singer virtually sings a musical piece (hereinafter referred to as "synthesized musical piece"). The information processing device 100 according to the first embodiment generates synthesized voice that is virtually pronounced in a pronunciation style selected from a plurality of pronunciation styles. A pronunciation style means, for example, a characteristic manner of pronunciation. Specifically, a characteristic related to a temporal change of a feature amount, such as pitch or volume (that is, the pattern of change of the feature amount), is one example of a pronunciation style. For example, the manner of singing suitable for various genre of music, such as rap, R&B (rhythm and blues), and punk, is one example of a pronunciation style.

As shown in FIG. 1, the information processing device 100 according to the first embodiment is realized by a computer system comprising an electronic controller (control device) 11, a storage device 12, a display device 13, an input device 14, and a sound output device 15. For example, a portable information terminal such as a mobile phone or a smartphone, or a portable or stationary information terminal such as a personal computer, can be used as the information processing device 100.

The display device 13 is a display including, for example, a liquid-crystal display panel or an organic electroluminescent display panel. The display device 13 displays an image according to an instruction from the electronic controller 11. The input device 14 is an input device (user operable input) that receives instructions from a user. Specifically, at least one operator, for example, a button, a switch, a lever, and/or a dial, that can be operated by the user, and/or a touch panel that detects contact with the display surface of the display device 13, are/is used as the input device 14. By appropriately operating the input device 14, the user can instruct the transition of acoustic characteristics, for example, the pitch of the synthesized voice (hereinafter referred to as "first characteristic transition"). The sound output device 15 (for example, a speaker or headphones) emits synthesized voice.

The electronic controller 11 includes one or more processors such as a CPU (Central Processing Unit) and executes various calculation processes and control processes. The term "electronic controller" as used herein refers to hardware that executes software programs. The storage device 12 is one or more memories including a known storage medium such as a magnetic storage medium or a semiconductor storage medium, which stores a program that is executed by the electronic controller 11 and various data that are used by the electronic controller 11. In other words, the storage device 12 is any computer storage device or any computer readable medium with the sole exception of a transitory, propagating signal. The storage device 12 can be a combination of a plurality of types of storage media. Moreover, a storage device 12 that is separate from the information processing device 100 (for example, cloud storage) can be provided, and the electronic controller 11 can read from or write to the storage device 12 via a communication network. That is, the storage device 12 may be omitted from the information processing device 100.

The storage device 12 of the first embodiment stores synthesis data X, voice element group L, and a plurality of transition estimation models M. The synthesis data X designate the content of voice synthesis. As shown in FIG. 1, the synthesis data X include range data X1 and musical score data X2. The range data X1 are data designating a prescribed range (hereinafter referred to as "specific range") R within a synthesized musical piece, and a pronunciation style Q within said specific range R. The specific range R is designated by, for example, a start time and an end time. One specific range or a plurality of specific ranges R are set in one synthesized musical piece.

The musical score data X2 is a music file specifying a time series of a plurality of notes constituting the synthesized musical piece. The musical score data X2 specify a pitch, a phoneme (pronunciation character), and a pronunciation period for each of a plurality of notes constituting the synthesized musical piece. The musical score data X2 can also specify a numerical value of a control parameter, such as volume (velocity), relating to each note. For example, a file in a format conforming to the MIDI (Musical Instrument Digital Interface) standard (SMF: Standard MIDI File) can be used as the musical score data X2. The musical score data X2 can specify pitch bend as defined by MIDI.

The voice element group L is a voice synthesis library including a plurality of voice elements. Each voice element is a phoneme unit (for example, a vowel or a consonant), which is the smallest unit of linguistic significance, or a phoneme chain in which a plurality of phonemes are connected. Each voice element is represented by the sample sequence of a time-domain voice waveform or of a time series of the frequency spectrum corresponding to the voice waveform. Each voice element is collected in advance from recorded voice of a specific speaker, for example.

The storage device 12 according to the first embodiment stores a plurality of transition estimation models M corresponding to different pronunciation styles. The transition estimation model M corresponding to each pronunciation style is a probability model for generating the transition of the pitch of the voice pronounced in said pronunciation style. Specifically, the transition estimation model M is used to generate the transition of the relative value of the pitch (hereinafter referred to as "relative transition") with respect to a prescribed reference value (for example, a pitch corresponding to a note). The relative value of the pitch represented by the relative transition is, for example, the pitch bend, which is expressed in cents.

The transition estimation model M of each pronunciation style is generated in advance by means of machine learning that utilizes numerous pieces of learning data corresponding to said pronunciation style. Specifically, it is a generative model obtained through machine learning in which the numerical value at each point in time in the transition of the acoustic characteristic represented by the learning data is associated with the context at said point in time (for example, the pitch, intensity, and duration of a note). For example, a recursive probability model that estimates the current transition from the history of past transitions is utilized as the transition estimation model M. By applying the transition estimation model M of an arbitrary pronunciation style Q to the musical score data X2, the relative transition of a voice pronouncing the note specified by the musical score data X2 in the pronunciation style Q is generated. In a relative transition generated by the transition estimation model M of each pronunciation style Q, changes in pitch peculiar to said pronunciation style Q can be observed. As described above, because the relative transition is generated using the transition estimation model M learned by means of machine learning, it is possible to generate the relative transition reflecting underlying trends in the learning data utilized for the machine learning. Pitch bend specified by the musical score data X2 can be included in the context used for machine learning of the transition estimation model M.

Figure 2:
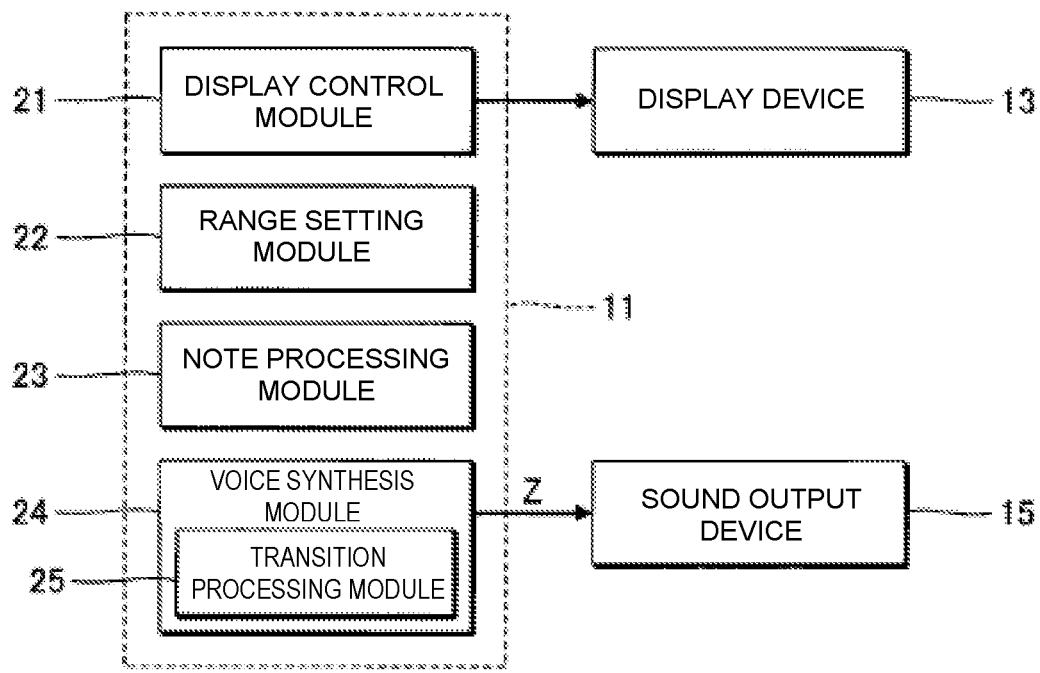
FIG. 2 is a block diagram illustrating a functional configuration of the information processing device.

FIG. 2 is a block diagram showing the functional configuration of the electronic controller 11. As shown in FIG. 2, the electronic controller 11 includes a display control module 21 (display control unit), a range setting module (range setting unit) 22, a note processing module (note processing unit) 23, and a voice synthesis module (voice synthesis unit) 24. More specifically, the electronic controller 11 executes a program stored in the storage device 12 in order to realize (execute) a plurality of modules (functions) including the display control module 21, the range setting module 22, the note processing module 23, and the voice synthesis module 24, for generating a voice signal Z representing the synthesized voice. Moreover, the functions of the electronic controller 11 can be realized by a plurality of devices configured separately from each other, or, some or all of the functions of the electronic controller 11 can be realized by a dedicated electronic circuit.

The display control module 21 causes the display device 13 to display various images. The display control module 21 according to the first embodiment causes the display device 13 to display the editing image G of FIG. 3. The editing image G is an image representing the content of the synthesis data X and includes a musical score area C and an instruction area D.

Figure 3:
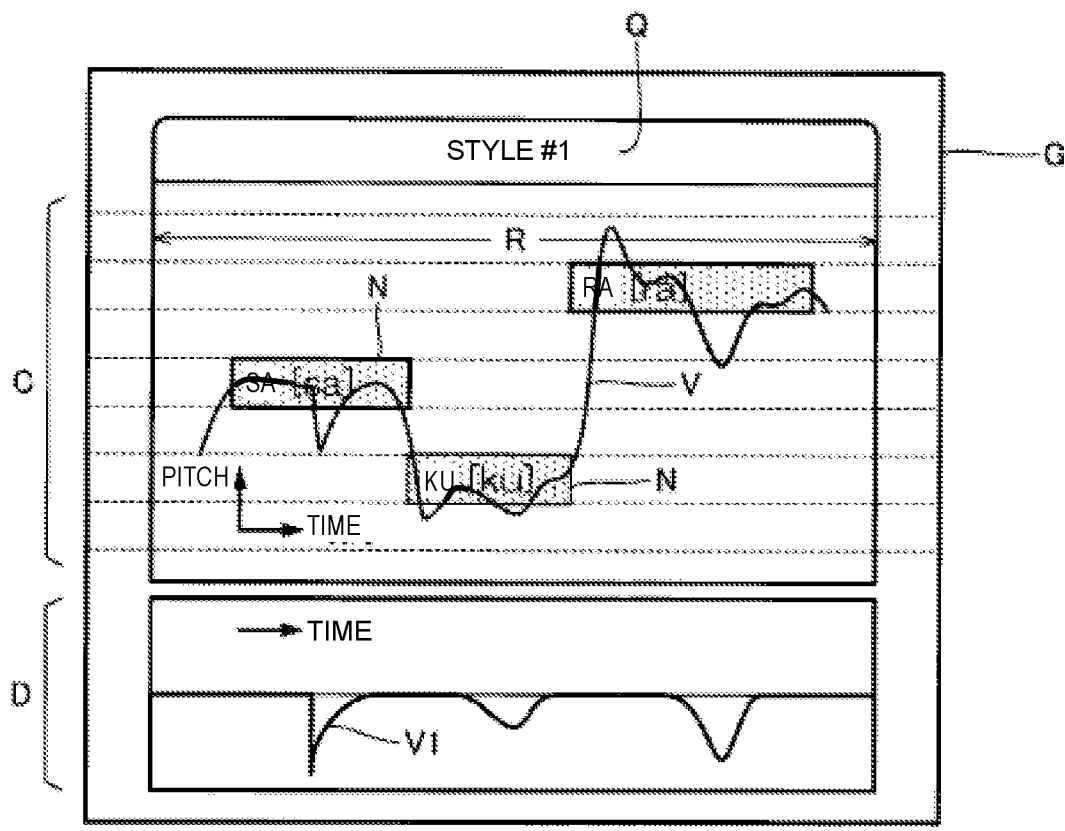
FIG. 3 is a schematic diagram of an editing image.

The musical score area C is a coordinate plane (piano roll screen) in which a horizontal time axis and a vertical pitch axis are set, and in which a time series of a plurality of notes of the synthesized musical piece is displayed. As shown in FIG. 3, the display control module 21 causes the musical score area C of the display device 13 to display the name of the pronunciation style Q and the specific range R designated by range data X1 of the synthesis data X. The specific range R is represented by a specified range of the time axis in the musical score area C. In addition, the display control module 21 causes the musical score area C to display a musical note figure N representing the musical note designated by the musical score data X2 of the synthesis data X. The musical note figure N is an essentially rectangular figure (so-called note bar) in which phonemes are arranged. The position of the musical note figure N in the pitch axis direction is set in accordance with the pitch designated by the musical score data X2. The end points of the musical note figure N in the time axis direction are set in accordance with the pronunciation period designated by the musical score data X2.

The instruction area D is an area in which the same time axis as in the musical score area C is set. A first characteristic transition V1 (that is, a time series of pitch bend) corresponding to an instruction from the user is displayed in the instruction area D. Specifically, the first characteristic transition V1 is expressed as a straight line, a curved line, or a combination thereof. The user can operate the instruction area D using the input device 14 in order to instruct to edit the shape of the first characteristic transition V1. Specifically, the display control module 21 causes the display device 13 to draw, in the instruction area D, the first characteristic transition V1 having a shape corresponding to the user's instructions.

The range setting module 22 of FIG. 2 sets the pronunciation style Q for the specific range R within the synthesized musical piece. By appropriately operating the input device 14, the user can instruct an addition or change of the specific range R, and the pronunciation style Q of the specific range R. The range setting module 22 adds or changes the specific range R and sets the pronunciation style Q of the specific range R in accordance with the user's instruction, and changes the range data X1 in accordance with said setting. Further, the display control module 21 causes the display device 13 to display the name of the pronunciation style Q and the specific range R designated by the range data X1 after the change. If the specific range R is added, the pronunciation style Q of the specific range R can be set to the initial value, and the pronunciation style Q of the specific range R can be changed in accordance with the user's instruction.

The note processing module 23 arranges notes within the specific range R for which the pronunciation style Q has been set, in accordance with the user's instruction. By appropriately operating the input device 14, the user can instruct the editing (for example, adding, changing, or deleting) of a note inside the specific range R. The note processing module 23 changes the musical score data X2 in accordance with the user's instruction. In addition, the display control module 21 causes the display device 13 to display a musical note figure N corresponding to each note designated by the musical score data X2 after the change.

The voice synthesis module 24 generates the voice signal Z of the synthesized voice designated by the synthesis data X. The voice synthesis module 24 according to the first embodiment generates the voice signal Z by means of concatenative voice synthesis. Specifically, the voice synthesis module 24 sequentially selects from the voice element group L the voice element corresponding to the phoneme of each note designated by the musical score data X2, adjusts the pitch and the pronunciation period of each voice element in accordance with the musical score data X2, and connects the voice elements to each other in order to generate the voice signal Z.

The voice synthesis module 24 according to the first embodiment includes a transition processing module (transition processing unit) 25. The transition processing module 25 generates a combined characteristic transition V for each specific range R. The combined characteristic transition V is the transition of an acoustic characteristic (specifically, pitch) that combines the first characteristic transition V1 and the second characteristic transition V2. The second characteristic transition V2 is the transition of the acoustic characteristic of a voice pronounced in the specific pronunciation style Q. That is, both the first characteristic transition V1 that the user draws in the instruction area D and the second characteristic transition V2 corresponding to the specific pronunciation style Q are reflected in the combined characteristic transition V of the first embodiment. The voice synthesis module 24 generates the voice signal Z of the synthesized voice whose pitch changes along the combined characteristic transition V generated by the transition processing module 25. That is, the pitch of the voice element selected in accordance with the phoneme of each note is adjusted to follow the combined characteristic transition V.

As shown in FIG. 3, the display control module 21 causes the musical score area C to display the combined characteristic transition V generated by the transition processing module 25. As can be understood from the foregoing explanation, the musical note figure N of the note within the specific range R and the combined characteristic transition V of the specific range R are displayed in the musical score area C, and the first characteristic transition V1 corresponding to the user's instruction is displayed in the instruction area D on the same time axis as that of the musical score area C. Thus, the user can visually ascertain the temporal relationship between the notes in the specific range R, the combined characteristic transition V, and the first characteristic transition V1. The musical note figure N and the combined characteristic transition V can also be displayed in separate areas.

Figure 4:
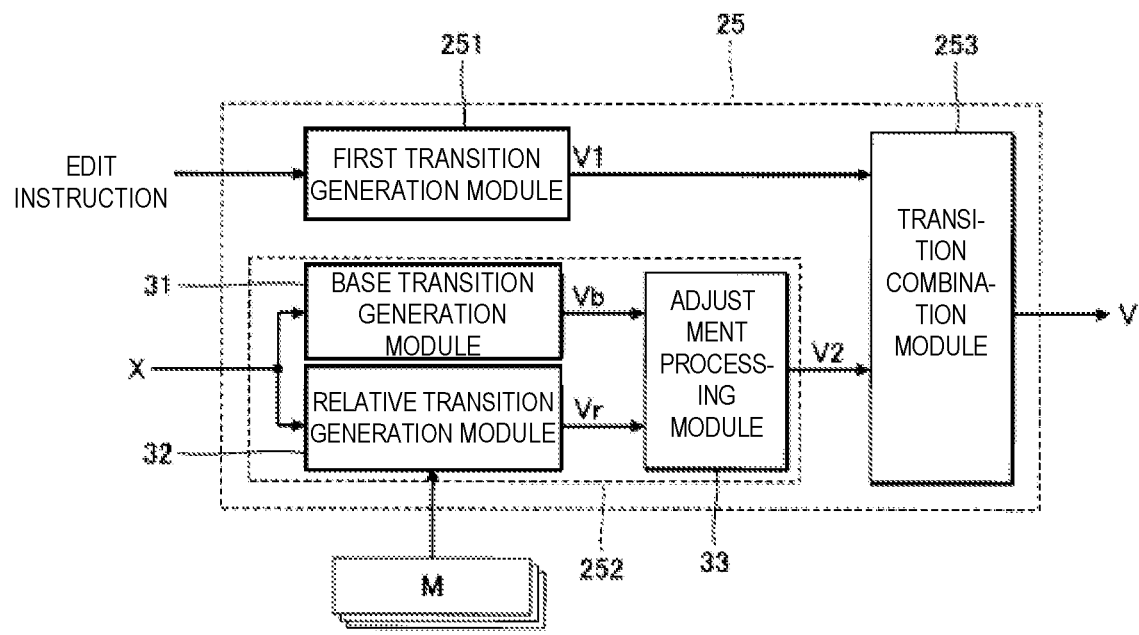
FIG. 4 is a block diagram illustrating a configuration of a transition generation module.

FIG. 4 is a block diagram illustrating a configuration of the transition processing module 25 according to the first embodiment. As shown in FIG. 4, the transition processing module 25 of the first embodiment includes a first transition generation module (first transition generation unit) 251, a second transition generation module (second transition generation unit) 252, and a transition combination module (transition combination unit) 253.

The first transition generation module 251 generates the first characteristic transition V1 according to the instruction from the user to the instruction area D. Specifically, the first transition generation module 251 generates the first characteristic transition V1 (that is, a time series of pitch bend) corresponding to a line drawing provided as an instruction in the instruction area D by the user by using the input device 14. The first characteristic transition V1 is included in the musical score data X2 as a time series of pitch bend.

The second transition generation module 252 generates the second characteristic transition V2 from the synthesis data X. The second transition generation module 252 according to the first embodiment includes a base transition generation module (base transition generation unit) 31, a relative transition generation module (relative transition generation unit) 32, and an adjustment processing module (adjustment processing unit) 33.

The base transition generation module 31 generates a base transition Vb corresponding to the pitch specified by the synthesis data X for each note. The base transition Vb is the basic transition of the acoustic characteristics in which the pitch smoothly transitions between successive notes. The relative transition generation module 32, on the other hand, generates a relative transition Vr from the synthesis data X. As described above, the relative transition Vr is the transition of the relative value of the pitch relative to the base transition Vb (that is, the relative pitch, which is the difference in pitch from the base transition Vb). The transition estimation model M is used for generating the relative transition Vr. Specifically, the relative transition generation module 32 selects from among the plurality of transition estimation models M the transition estimation model M that is in the pronunciation style Q set for the specific range R, and applies the transition estimation model M to the part of the musical score data X2 within the specific range R in order to generate the relative transition Vr.

The adjustment processing module 33 adjusts and combines the base transition Vb generated by the base transition generation module 31 and the relative transition Vr generated by the relative transition generation module 32 in order to generate the second characteristic transition V2. Specifically, the adjustment processing module 33 adjusts the base transition Vb or the relative transition Vr in accordance with the time length of the voiced sound and unvoiced sound in each voice element selected in accordance with the phoneme of each note, or in accordance with control parameters such as the volume of each note, and combines the adjusted base transition Vb and relative transition Vr in order to generate the second characteristic transition V2. The information reflected in the adjustment of the base transition Vb or the relative transition Vr is not limited to the example described above. In addition, the adjustment can be carried out after combining the base transition Vb and the relative transition Vr.

Figure 5:
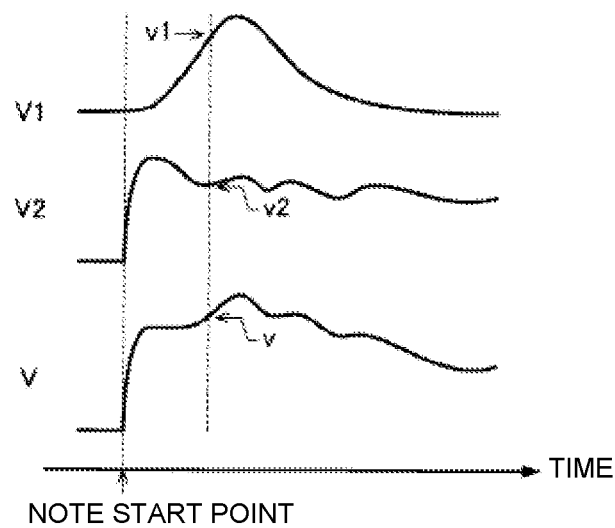
FIG. 5 is an explanatory diagram of the synthesis of a first characteristic transition and a second characteristic transition.

The transition combination module 253 combines the first characteristic transition V1 generated by the first transition generation module 251 and the second characteristic transition V2 generated by the second transition generation module 252 in order to generate the combined characteristic transition V. As shown in FIG. 5, the characteristic value v (that is, the numerical value of the pitch) at an arbitrary point in time on the time axis of the combined characteristic transition V is the value obtained by adding a characteristic value v1 at said point in time of the first characteristic transition V1 and a characteristic value v2 at the point in time of the second characteristic transition V2. The addition of cent values corresponds to multiplication on a linear scale. The weighted sum of the characteristic value v1 and the characteristic value v2 can be calculated as the characteristic value v. Each weighted value of the characteristic value v1 and weighted value of the characteristic value v2 is set variably, in accordance with the user's instruction to the input device 14, for example.

The adjustment by the adjustment processing module 33 can be carried out by the transition combination module 253. For example, the transition combination module 253 adjusts the relative transition Vr and combines the first characteristic transition V1, the base transition Vb, and the adjusted relative transition Vr in order to generate the combined characteristic transition V. By means of the foregoing configuration, the combination of the base transition Vb generated by the base transition generation module 31 and the relative transition Vr generated by the relative transition generation module 32 is supplied from the second transition generation module 252 to the transition combination module 253 as the second characteristic transition V2. The adjustment processing module 33 can be omitted.

Figure 6:
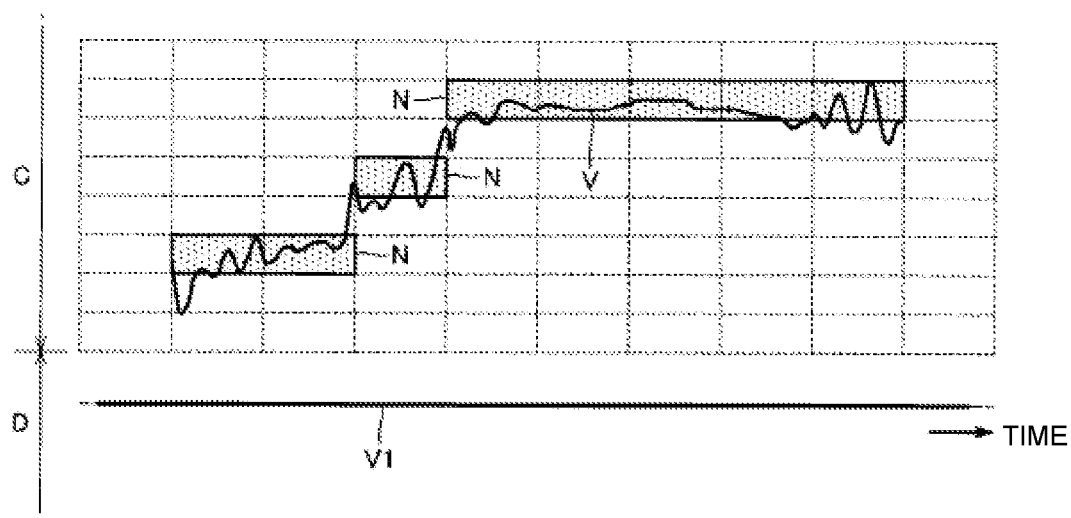
FIG. 6 is an explanatory diagram of the relationship between the first characteristic transition and combined characteristic transition.
Figure 7:
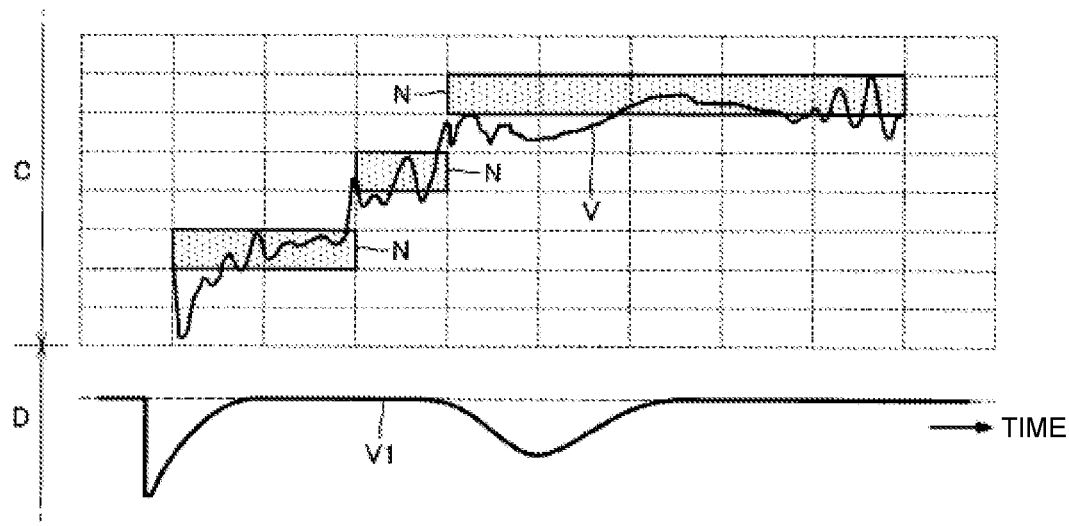
FIG. 7 is an explanatory diagram of the relationship between the first characteristic transition and a combined characteristic transition.

FIG. 6 illustrates the combined characteristic transition V in a state in which the user has set notes in the specific range R in the new musical score data X2 but has not provided instruction for the first characteristic transition V1, and FIG. 7 illustrates the combined characteristic transition V in a state in which the user has provided instruction for the first characteristic transition V1 from the state of FIG. 6. In the state of FIG. 6, the characteristic value v1 of each point in time of the first characteristic transition V1 is set to the initial value (pitch bend=zero). Accordingly, the second characteristic transition V2 corresponding to a specific pronunciation style Q1 (an example of a first pronunciation style) is displayed in the musical score area C as the combined characteristic transition V. Specifically, the combined characteristic transition V corresponding to the combination of the base transition Vb and the relative transition Vr is displayed in the musical score area C. When the user provides instruction for the first characteristic transition V1, the combined characteristic transition V in the musical score area C is changed to a shape in which the first characteristic transition V1 is reflected on the second characteristic transition V2, as shown in FIG. 7.

Figure 8:
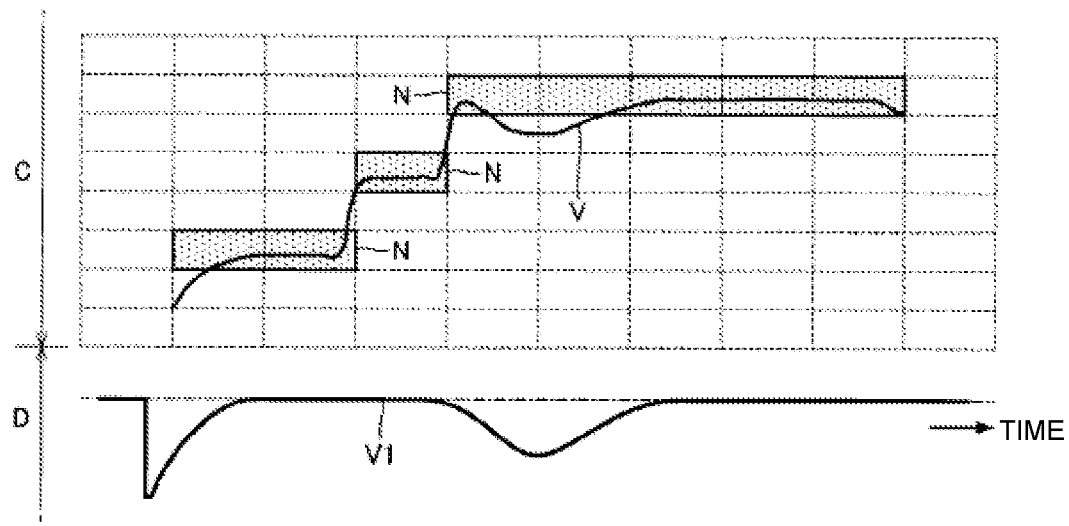
FIG. 8 is an explanatory diagram of the relationship between the first characteristic transition and the combined characteristic transition.

FIGS. 6 and 7 assume a case in which the pronunciation style Q1 is set in the specific range R. FIG. 8, on the other hand, illustrates the combined characteristic transition V in a case in which the pronunciation style Q of the specific range R has been changed from the pronunciation style Q1 to a pronunciation style Q2 (an example of a second pronunciation style). As shown in FIG. 8, when the pronunciation style Q1 is changed to the pronunciation style Q2 by the range setting module 22, the second characteristic transition V2 generated by the second transition generation module 252 is changed, by the second transition generation module 252, from a characteristic transition by the transition estimation model M corresponding to the pronunciation style Q1 to a characteristic transition by the transition estimation model M corresponding to the pronunciation style Q2. On the other hand, as can be understood from FIGS. 7 and 8, even if the pronunciation style Q is changed, the first characteristic transition V1 specified by the musical score data X2 is not changed by the first transition generation module 251. That is, the second characteristic transition V2 changes in conjunction with the pronunciation style Q while the first characteristic transition V1 is maintained, and, as a result, the change in the pronunciation style Q is reflected on the combined characteristic transition V as well.

Figure 9:
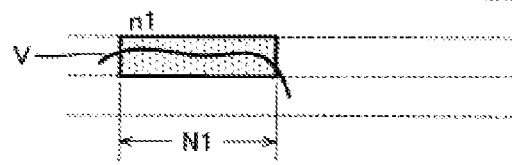
FIG. 9 is an explanatory diagram of the relationship between a note and a characteristic transition.
Figure 10:
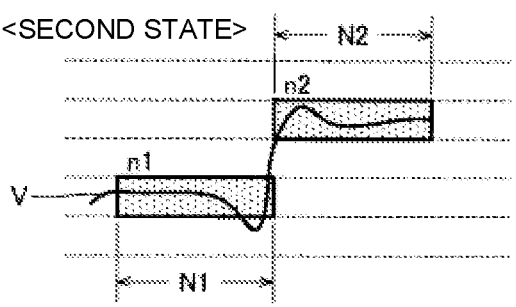
FIG. 10 is an explanatory diagram of the relationship between the note and the characteristic transition.

The relationship between the musical notes and the combined characteristic transition V generated by the transition processing module 25 will now be described. FIG. 9 illustrates a first state in which a first note n1 (musical note figure N1) is set within the specific range R, and FIG. 10 illustrates a second state in which a second note n2 (musical note figure N2) is added to the specific range R in the first state.

The second characteristic transition V2 generated by the second transition generation module 252 is affected by the time series of the notes arranged in the specific range R. Therefore, as can be understood from FIGS. 9 and 10, the part of the combined characteristic transition V corresponding to the first note n1 differs between the first state and the second state. That is, the shape of the part of the combined characteristic transition V corresponding to the first note n1 changes in accordance with the presence/absence of the second note n2 in the specific range R. For example, when a transition is made from the first state to the second state due to the addition of the second note n2, the combined characteristic transition V changes from a shape that decreases at the end point of the first note n1 (the shape in the first state), to a shape that rises from the first note n1 to the second note n2 (the shape in the second state).

As described above, in the first embodiment, the part of the combined characteristic transition V corresponding to the first note n1 changes in accordance with the presence/absence of the second note n2 in the specific range R. Therefore, it is possible to generate a natural combined characteristic transition V that reflects the tendency to be affected by not only individual notes but also the relationship between surrounding notes.

Figure 11:
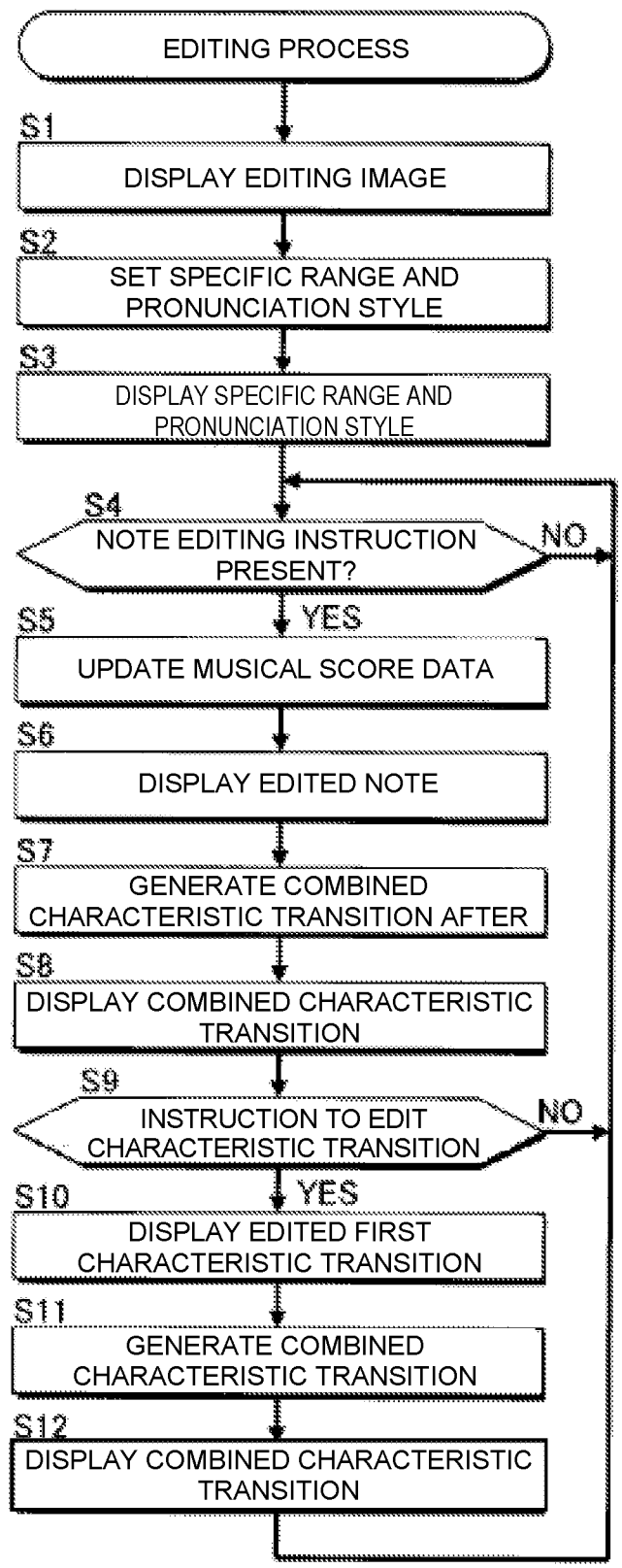
FIG. 11 is a flowchart illustrating a process executed by an electronic controller.

FIG. 11 is a flowchart illustrating the specific procedure of a process (hereinafter referred to as "editing process") that is executed by the electronic controller 11 of the first embodiment. For example, the editing process of FIG. 11 is started in response to an instruction from the user to the input device 14.

When the editing process is started, the display control module 21 first causes the display device 13 to display the editing image G (S1). For example, at the stage immediately following the creation of new musical score data X2, the initial editing image Gin which the specific range R and the notes are not set in the musical score area C is displayed. The range setting module 22 sets the specific range R in the musical score area C and the pronunciation style Q of the specific range R in accordance with an instruction from the user (S2). That is, the pronunciation style Q of the specific range R is set before the notes of the synthesized musical piece are set. The display control module 21 causes the display device 13 to display the specific range R and the pronunciation style Q (S3).

The user can issue an instruction to edit the notes within the musical score area C and the first characteristic transition V1 in the instruction area D, regarding the specific range R set according to the procedure described above. The electronic controller 11 determines whether the user has issued an instruction to edit the note (S4).

When the user issues an instruction to edit the note (S4: YES), the note processing module 23 edits the notes in the specific range R in accordance with the instruction (S5). For example, the note processing module 23 edits the note (add, change, or delete) in accordance with the user's instruction, and changes the musical score data X2 in accordance with the editing result. Since notes were added within the specific range R for which the pronunciation style Q is set, the pronunciation style Q is also applied to these notes. The display control module 21 causes the display device 13 to display the edited notes within the musical score area C (S6).

The transition processing module 25 generates the combined characteristic transition V of the case in which notes within the specific range R are pronounced in the pronunciation style Q set for the specific range R (S7). Specifically, the second characteristic transition V2 corresponding to the edited notes is generated by the second transition generation module 252, and the second characteristic transition V2 is combined with the first characteristic transition V1 generated by the first transition generation module 251, in order to generate the combined characteristic transition V. That is, the shape of the combined characteristic transition V of the specific range R is changed each time a note within the specific range R is edited. The display control module 21 causes the instruction area D of the display device 13 to display the combined characteristic transition V that is generated by the transition processing module 25 (S8).

As described above, in the first embodiment, notes are arranged in the specific range R for which the pronunciation style Q is set, and the combined characteristic transition V of the voice pronouncing the notes within the specific range R in the pronunciation style Q set for the specific range R is generated. Thus, when the user issues an instruction to edit a note, the pronunciation style Q is automatically set for the edited note. That is, it is possible to reduce the workload of the user in regard to specifying the pronunciation style of each note.

The electronic controller 11 determines whether the user instructed has provided an instruction to edit the first characteristic transition V1 (S9). When the editing of the first characteristic transition V1 has been instructed (S9: YES), the display control module 21 edits the first characteristic transition V1 specified by the musical score data X2 in accordance with the user's instruction and displays the edited first characteristic transition V1 in the instruction area D (S10). In addition, the transition processing module 25 generates the combined characteristic transition V that reflects said edit (S11). Specifically, the first characteristic transition V1 corresponding to the user's instruction is generated by the first transition generation module 251, and the first characteristic transition V1 is combined with the second characteristic transition V2 generated by the second transition generation module 252, in order to generate the combined characteristic transition V. That is, the combined characteristic transition V is changed each time the first characteristic transition V1 is edited. The display control module 21 causes the display device 13 to display the combined characteristic transition V that is generated by the transition processing module 25 (S12).

As can be understood from the foregoing explanation, the generation of the combined characteristic transition V of the specific range R (S7, S11) and the display of the combined characteristic transition V (S8, S12) are executed each time a note within the musical score area C or the first characteristic transition V1 within the instruction area D is edited. Therefore, each time the editing image G is edited, the user can confirm the combined characteristic transition V reflecting the relevant edit.

As described above, in the first embodiment, the first characteristic transition V1 corresponding to the user's instruction and the second characteristic transition V2 corresponding to the specific pronunciation style Q selected from the plurality of pronunciation styles Q are combined to generate the combined characteristic transition V for voice synthesis. Thus, compared to a configuration in which the combined characteristic transition V is generated in accordance with only the user's instruction, it is possible to reduce the workload in regard to adjusting the transition of the acoustic characteristics of the synthesized voice.

In the first embodiment, a line drawing drawn by the user is used as the first characteristic transition V1, so that it is possible to finely adjust the combined characteristic transition V in accordance with the intention of the user. In addition, when the pronunciation style Q is changed, the second characteristic transition V2 is changed while the first characteristic transition V1 is maintained, so that there is the advantage that it is possible to generate the combined characteristic transition V that faithfully reflects the intention of the user before and after the change in the pronunciation style Q.

Second Embodiment

The second embodiment will be described. In each of the examples below, elements that have the same functions as in the first embodiment have been assigned the same reference symbols as those used to describe the first embodiment, and detailed descriptions thereof have been appropriately omitted.

In the first embodiment, the relative transition Vr of the pronunciation style Q is generated using the transition estimation model M of the pronunciation style Q set by the user. The transition processing module 25 according to the second embodiment generates the relative transition Vr (and thus the combined characteristic transition V) using an expression sample prepared in advance.

The storage device 12 of the second embodiment stores a plurality of expression samples, respectively corresponding to a plurality of pronunciation expressions. The expression sample of each pronunciation expression is a time series of a plurality of samples representing the transition of the pitch (specifically, the relative value) of the voice that is pronounced by means of said pronunciation expression. A plurality of expression samples corresponding to different conditions (context) are stored in the storage device 12 for each pronunciation style Q.

The transition processing module 25 according to the second embodiment selects an expression sample by means of an expression selection model corresponding to the pronunciation style Q set for the specific range R, and generates the relative transition Vr (and thus the combined characteristic transition V) using said expression sample. The expression selection model is a classification model obtained by carrying out machine-learning by associating the pronunciation style and the context with the trend of selection of the expression sample applied to the notes specified by the musical score data X2. For example, an operator versed in various pronunciation expressions selects an expression sample appropriate for a particular pronunciation style Q and context, and learning data in which the musical score data X2 representing said context and the expression sample selected by the operator are associated are used for the machine learning in order to generate the expression selection model for each pronunciation style Q. The expression selection model for each pronunciation style Q is stored in the storage device 12. Whether a particular expression sample is applied to one note affects not only the characteristics (pitch or duration) of the note, but also the characteristics of the preceding and following notes, or the expression sample applied to the preceding and following notes.

The relative transition generation module 32 according to the second embodiment uses the expression selection model corresponding to the pronunciation style Q of the specific range R to select the expression sample in Step S7 of the editing process (FIG. 7). Specifically, the relative transition generation module 32 uses the expression selection model to select the note to which the expression sample is applied from among the plurality of notes specified by the musical score data X2, and the expression sample to be applied to said note. Then, the relative transition generation module 32 applies the transition of the pitch of the selected expression sample to said note in order to generate the relative transition Vr. In the same manner as the first embodiment, the adjustment processing module 33 generates the second characteristic transition V2 from the base transition Vb generated by the base transition generation module 31 and the relative transition Vr generated by the relative transition generation module 32.

As can be understood from the foregoing explanation, the transition processing module 25 of the second embodiment generates the combined characteristic transition V from the transition of the pitch of the expression sample selected in accordance with the pronunciation style Q for each note within the specific range R. The display of the combined characteristic transition V generated by the transition processing module 25 and the generation of the voice signal Z utilizing the combined characteristic transition V are the same as in the first embodiment.

The same effect as that in the first embodiment is realized in the second embodiment. In addition, in the second embodiment, since the second characteristic transition V2 is generated in accordance with the transition of the pitch of the selected expression sample having the trend corresponding to the pronunciation style Q, it is possible to generate a combined characteristic transition V that faithfully reflects the trend of the transition of the pitch in the expression sample.

Third Embodiment

In the third embodiment, an adjustment parameter P is applied to the generation of the combined characteristic transition V by the transition processing module 25. The numerical value of the adjustment parameter P is variably set in accordance with the user's instruction to the input device 14. The adjustment parameter P of the third embodiment includes a first parameter P1 and a second parameter P2. The adjustment processing module 33 of the transition processing module 25 sets the numerical value of each of the first parameter P1 and the second parameter P2 in accordance with the user's instruction. The first parameter P1 and the second parameter P2 are set for each of the specific range R.

The adjustment processing module 33 controls the minute fluctuations in the relative transition Vr of each of the specific range R in accordance with the numerical value of the first parameter P1 set for the specific range R. For example, high-frequency components (that is, temporally unstable and minute fluctuation components) of the relative transition Vr are controlled in accordance with the first parameter P1. Singing voice in which minute fluctuations are suppressed gives the listener the impression of a talented singer. Accordingly, the first parameter P1 corresponds to a parameter relating of the singing skill expressed by the synthesized voice.

In addition, adjustment processing module 33 controls the pitch fluctuation range in the relative transition Vr in each of the specific range R, in accordance with the numerical value of the second parameter P2 set for the specific range R. The pitch fluctuation range affects the intonations of the synthesized voice that the listener perceives. That is, the greater the pitch fluctuation range, the greater will be the listener's perception of the intonations of the synthesized voice. Accordingly, the second parameter P2 corresponds to a parameter relating to the intonation of the synthesized voice. The display of the combined characteristic transition V generated by the adjustment processing module 33 and the generation of the voice signal Z utilizing the combined characteristic transition V are the same as in the first embodiment.

The same effect as the first embodiment is realized in the third embodiment. In addition, according to the third embodiment, it is possible to generate various combined characteristic transitions V in accordance with the adjustment parameter P set in accordance with the user's instruction.

In the foregoing explanation, the adjustment parameter P is set for the specific range R, but the range of setting the adjustment parameter P is not limited to the example described above. Specifically, the adjustment parameter P can be set for the entire synthesized musical piece, or the adjustment parameter P can be adjusted for each note. For example, the first parameter P1 can be set for the entire synthesized musical piece, and the second parameter P2 can be set for the entire synthesized musical piece or for each note.

Modified Examples

Specific modified embodiments to be added to each of the embodiments as exemplified above are illustrated in the following. Two or more embodiments arbitrarily selected from the following examples can be appropriately combined as long as they are not mutually contradictory.

(1) In the embodiments described above, the voice element group L of one type of tone is used for voice synthesis, but a plurality of voice element groups L can be selectively used for voice synthesis. The plurality of voice element groups L include voice elements extracted from the voices of different speakers. That is, the tone of each voice element is different for each voice element group L. The voice synthesis module 24 generates the voice signal Z by means of voice synthesis utilizing the voice element group L selected from among the plurality of voice element groups L in accordance with the user's instruction. That is, the voice signal Z is generated so as to represent the synthesized voice having the tone which, among a plurality of tones, corresponds to an instruction from the user. According to the configuration described above, it is possible to generate a synthesized voice having various tones. The voice element group L can be selected for each section in the synthesized musical piece (for example, for each specific range R).

(2) In the embodiments described above, the combined characteristic transition V over the entire specific range R is changed each time a note is edited, but a portion of the combined characteristic transition V can be changed instead. That is, the transition processing module 25 changes a specific range (hereinafter referred to as "change range") of the combined characteristic transition V of the specific range R including the note to be edited. The change range is, for example, a range which includes a continuous sequence of notes that precede and follow the notes to be edited (for example, a period corresponding to one phrase of the synthesized musical piece). By means of the configuration described above, it is possible to reduce the processing load of the transition processing module 25 compared with a configuration in which the combined characteristic transition V is generated over the entire specific range R each time a note is edited.

(3) The generation of the second characteristic transition V2 using the transition estimation model M (first embodiment) and the generation of the second characteristic transition V2 using the expression sample (second embodiment) can be used in combination. For example, the second characteristic transition V2 is generated using the transition estimation model M for a first section of the synthesized musical piece, and the second characteristic transition V2 is generated using the expression sample for a second section that is different from the first section. The generation of the second characteristic transition V2 using the transition estimation model M and the generation of the second characteristic transition V2 using the expression sample can be selectively applied to each note of the synthesized musical piece.

(4) There are cases in which, after the first note n1 is added in the musical score area C, the user issues an instruction to edit a different second note n2, before completion of the process for the transition processing module 25 to generate the combined characteristic transition V corresponding to the time series of the added note. In the case described above, the intermediate result of the generation of the combined characteristic transition V corresponding to the addition of the first note n1 is discarded, and the transition processing module 25 generates the combined characteristic transition V corresponding to the time series of the notes including the first note n1 and the second note n2.

Figure 12:
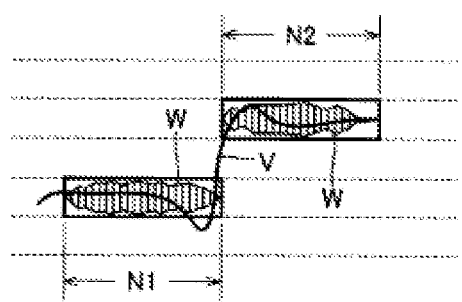
FIG. 12 is a schematic diagram of an editing image in a modified example.

(5) In the embodiments described above, the musical note figure N corresponding to each note of the synthesized musical piece is displayed in the musical score area C, but an audio waveform represented by the voice signal Z can be arranged in the musical score area C together with the musical note figure N (or instead of the musical note figure N). For example, as shown in FIG. 12, an audio waveform W of the portion of the voice signal Z corresponding to the note is displayed so as to overlap the musical note figure N of each note.

(6) In the embodiments described above, the combined characteristic transition V is displayed in the musical score area C, but the base transition Vb and/or the second characteristic transition V2 can be displayed on the display device 13 in addition to the combined characteristic transition V (or instead of the combined characteristic transition V). The base transition Vb or the second characteristic transition V2 is displayed in a display mode that is different from that of the combined characteristic transition V (that is, in a visually distinguishable image form). Specifically, the base transition Vb or the second characteristic transition V2 is displayed using a different color or line type than those of the combined characteristic transition V.

(7) In the embodiments described above, the transition of the pitch of the synthesized voice is illustrated as an example of the combined characteristic transition V, but the acoustic characteristic represented by the combined characteristic transition V is not limited to pitch. For example, the volume of the synthesized voice can be generated by the transition processing module 25 as the combined characteristic transition V.

(8) In the embodiments described above, the pronunciation style Q is set for each of the specific range R, but the range for which the pronunciation style Q is set in the synthesized musical piece is not limited to the specific range R. For example, one pronunciation style Q can be set over the entire synthesized musical piece, or the pronunciation style Q can be set for each note.

(9) In the embodiments described above, the voice synthesizing device that generates the synthesized voice is illustrated as an example of the information processing device 100, but the generation of the synthesized voice is not essential. For example, the information processing device 100 can also be realized as a characteristic transition generation device that generates the characteristic transition V of the synthesized voice. In the characteristic transition generation device, the presence/absence of a function for generating the voice signal Z of the synthesized voice (voice synthesis module 24) does not matter.

(10) The function of the information processing device 100 according to the embodiments described above is realized by cooperation between a computer (for example, the electronic controller 11) and a program. A program according to one aspect of the present disclosure causes a computer to function as the first transition generation module 251 for generating the first characteristic transition V1, which is the transition of acoustic characteristics, in accordance with the user's instruction, the second transition generation module 252 for generating the second characteristic transition V2, which is the transition of acoustic characteristics of voice that is pronounced in the specific pronunciation style, and the transition combination module 253 for generating the combined characteristic transition V, which is the transition of the acoustic characteristics of synthesized voice, by combining the first characteristic transition V1 and the second characteristic transition V2.

The program as exemplified above can be stored on a computer-readable storage medium and installed in a computer. The storage medium, for example, is a non-transitory storage medium, a good example of which is an optical storage medium (optical disc) such as a CD-ROM, but can include storage media of any known format, such as a semiconductor storage medium or a magnetic storage medium. Non-transitory storage media include any storage medium that excludes transitory propagating signals and does not exclude volatile storage media. Furthermore, the program can be delivered to a computer in the form of distribution via a communication network.

Aspects

For example, the following configurations may be understood from the embodiments as exemplified above.

An information processing method according to one aspect (first aspect) of the present disclosure comprises generating a first characteristic transition which is the transition of acoustic characteristics, in accordance with a user's instruction, generating a second characteristic transition which is the transition of acoustic characteristics of voice that is pronounced in a specific pronunciation style selected from a plurality of pronunciation styles, and generating a combined characteristic transition which is the transition of the acoustic characteristics of synthesized voice by means of combining the first characteristic transition and the second characteristic transition. By means of the aspect described above, the first characteristic transition corresponding to the user's instruction and the second characteristic transition corresponding to the specific pronunciation style selected from a plurality of pronunciation styles are combined in order to generate the combined characteristic transition of the synthesized voice. Therefore, compared to a configuration in which the combined characteristic transition is generated in accordance with only the user's instruction, it is possible to reduce the workload in regard to adjusting the transition of the acoustic characteristics of the synthesized voice.

In one example (second aspect) of the first aspect, the first characteristic transition is represented by a line drawing drawn by the user. By means of the aspect described above, a line drawing drawn by the user is used as the first characteristic transition, so that it is possible to finely adjust the combined characteristic transition in accordance with the intention of the user.

In one example (third aspect) of the first or the second aspect, in the generation of the second characteristic transition, a transition estimation model corresponding to the specific pronunciation style from among a plurality of transition estimation models respectively corresponding to the plurality of pronunciation styles is used to generate the second characteristic transition. By means of the aspect described above, because the second characteristic transition is generated using the transition estimation model learned by means of machine learning, it is possible to generate the combined characteristic transition reflecting trends latent in the learning data utilized for the machine learning.

In one example (fourth aspect) of the first or the second aspect, in the generation of the second characteristic transition, a transition of acoustic characteristics of an expression sample corresponding to the specific pronunciation style from among a plurality of expression samples representing voice respectively corresponding to the plurality of pronunciation styles is generated as the second characteristic transition. By means of the aspect described above, because the second characteristic transition is generated in accordance with the transition of the acoustic characteristics of the expression sample, it is possible to generate the combined characteristic transition that faithfully reflects the trend of the transition of the acoustic characteristics of the expression sample.

In one example (fifth aspect) of the first or the second aspect, in the generation of the second characteristic transition, an expression selection model corresponding to the specific pronunciation style from among a plurality of expression selection models is used to select an expression sample corresponding to a note from among a plurality of expression samples representing voice, in order to generate the second characteristic transition in accordance with the transition of the characteristic of the expression sample. By means of the aspect described above, it is possible to select the appropriate expression sample corresponding to the situation of the note by means of the expression selection model. The expression selection model is a classification model obtained by carrying out machine-learning by associating the pronunciation style and the context with the trend of selection of the expression sample applied to the notes. The context relating to a note is the situation relating to said note, such as the pitch, intensity or duration of the note or the surrounding notes.

In one example (sixth aspect) of any one of the first to the fifth aspects, when the specific pronunciation style is changed from a first pronunciation style to a second pronunciation style, the second characteristic transition is changed from a characteristic transition corresponding to the first pronunciation style to a characteristic transition corresponding to the second pronunciation style, while maintaining the first characteristic transition. By means of the aspect described above, when the pronunciation style is changed, the second characteristic transition is changed while the first characteristic transition is maintained, so that there is the advantage that it is possible to generate the combined characteristic transition that faithfully reflects the intention of the user before and after the change in the pronunciation style.

In one example (seventh aspect) of any one of the first to the sixth aspects, in the generation of the combined characteristic transition, the combined characteristic transition is generated in accordance with an adjustment parameter set in accordance with the user's instruction. By means of the aspect described above, it is possible to generate various combined characteristic transitions in accordance with the adjustment parameter set in accordance with the user's instruction.

In one example (eighth aspect) of any one of the first to the seventh aspects, a voice signal representing a synthesized voice whose acoustic characteristic changes following the combined characteristic transition is generated. By means of the aspect described above, it is possible to generate a voice signal of the synthesized voice reflecting the characteristic transition, while reducing the workload in regard to adjusting the transition of the acoustic characteristic of the synthesized voice.

In one example (ninth aspect) of the eighth aspect, in the generation of the voice signal, the voice signal representing the synthesized voice having a tone selected from among a plurality of tones in accordance with the user's instruction, is generated. By means of the aspect described above, it is possible to generate synthesized voice having various tones.

One aspect of the present disclosure can also be realized by an information processing device that executes the information processing method of each aspect as exemplified above or by a program that causes a computer to execute the information processing method of each aspect as exemplified above.

What is claimed is:

1. An information processing method realized by a computer, the information processing method comprising:
   generating a first characteristic transition which is a transition of an acoustic characteristic, in accordance with an instruction from a user;
   generating a second characteristic transition which is a transition of an acoustic characteristic of voice that is pronounced in a specific pronunciation style selected from a plurality of pronunciation styles;
   setting, in accordance with an instruction from the user, a first weighted value for the first characteristic transition and a second weighted value for the second characteristic transition, and calculating a weighted sum of the first characteristic transition and the second characteristic transition by using the first weighted value and the second weighted value; and
   generating a combined characteristic transition which is a transition of an acoustic characteristic of synthesized voice, by combining the first characteristic transition and the second characteristic transition using the weighted sum,
   the acoustic characteristic for the first characteristic transition, the acoustic characteristic of the voice for the second characteristic transition, and the acoustic characteristic of the synthesized voice for the combined characteristic transition being the same acoustic characteristic.

2. The information processing method according to claim 1, wherein
   the first characteristic transition is generated such that the first characteristic transition represents a line drawing drawn by the user.

3. The information processing method according to claim 1, wherein
   the second characteristic transition is generated by using a transition estimation model corresponding to the specific pronunciation style from a plurality of transition estimation models respectively corresponding to the plurality of pronunciation styles.

4. The information processing method according to claim 1, wherein
   the second characteristic transition is generated by generating, as the second characteristic transition, a transition of an acoustic characteristic of an expression sample corresponding to the specific pronunciation style from a plurality of expression samples representing voices respectively corresponding to the plurality of pronunciation styles.

5. The information processing method according to claim 1, wherein
   in the generation of the second characteristic transition, an expression sample corresponding to a note is selected from among a plurality of expression samples representing voices by using an expression selection model corresponding to the specific pronunciation style from a plurality of expression selection models, to generate the second characteristic transition in accordance with a transition of characteristic of the expression sample.

6. The information processing method according to claim 1, wherein
   in response to change of the specific pronunciation style from a first pronunciation style to a second pronunciation style, the second characteristic transition is changed from a characteristic transition corresponding to the first pronunciation style to a characteristic transition corresponding to the second pronunciation style, while the first characteristic transition is maintained.

7. The information processing method according to claim 1, wherein
   the combined characteristic transition is generated in accordance with an adjustment parameter that is set in accordance with an instruction from the user.

8. An information processing device comprising:
   an electronic controller including at least one processor, the electronic controller being configured to
   generate a first characteristic transition which is a transition of an acoustic characteristic, in accordance with an instruction from a user,
   generate a second characteristic transition which is a transition of an acoustic characteristic of voice that is pronounced in a specific pronunciation style selected from a plurality of pronunciation styles,
   set, in accordance with an instruction from the user, a first weighted value for the first characteristic transition and a second weighted value for the second characteristic transition, and calculate a weighted sum of the first characteristic transition and the second characteristic transition by using the first weighted value and the second weighted value, and
   generate a combined characteristic transition which is a transition of an acoustic characteristic of synthesized voice, by combining the first characteristic transition and the second characteristic transition using the weighted sum,
   the acoustic characteristic for the first characteristic transition, the acoustic characteristic of the voice for the second characteristic transition, and the acoustic characteristic of the synthesized voice for the combined characteristic transition being the same acoustic characteristic.

9. The information processing device according to claim 8, wherein
   the electronic controller generates the first characteristic transition that represents a line drawing drawn by the user.

10. The information processing device according to claim 8, wherein
the electronic controller uses a transition estimation model corresponding to the specific pronunciation style from a plurality of transition estimation models respectively corresponding to the plurality of pronunciation styles to generate the second characteristic transition.

11. The information processing device according to claim 8, wherein
the electronic controller generates, as the second characteristic transition, a transition of an acoustic characteristic of an expression sample corresponding to the specific pronunciation style from a plurality of expression samples representing voices respectively corresponding to the plurality of pronunciation styles.

12. The information processing device according to claim 8, wherein
the electronic controller selects an expression sample corresponding to a note from a plurality of expression samples representing voices by using an expression selection model corresponding to the specific pronunciation style from a plurality of expression selection models, to generate the second characteristic transition in accordance with a transition of characteristic of the expression sample.

13. The information processing device according to claim 8, wherein
in response to change of the specific pronunciation style from a first pronunciation style to a second pronunciation style, the electronic controller changes the second characteristic transition from a characteristic transition corresponding to the first pronunciation style to a characteristic transition corresponding to the second pronunciation style, while maintaining the first characteristic transition.

14. The information processing device according to claim 8, wherein
the electronic controller generates the combined characteristic transition corresponding to an adjustment parameter that is set in accordance with an instruction from the user.

15. A non-transitory computer-readable medium storing a program that causes a computer to execute a process, the process comprising:
generating a first characteristic transition which is a transition of an acoustic characteristic, in accordance with an instruction from a user;
generating a second characteristic transition which is a transition of an acoustic characteristic of voice that is pronounced in a specific pronunciation style;
setting, in accordance with an instruction from the user, a first weighted value for the first characteristic transition and a second weighted value for the second characteristic transition, and calculating a weighted sum of the first characteristic transition and the second characteristic transition by using the first weighted value and the second weighted value; and
generating a combined characteristic transition which is a transition of an acoustic characteristic of synthesized voice, by combining the first characteristic transition and the second characteristic transition using the weighted sum,
the acoustic characteristic for the first characteristic transition, the acoustic characteristic of the voice for the second characteristic transition, and the acoustic characteristic of the synthesized voice for the combined characteristic transition being the same acoustic characteristic.

16. The information processing method according to claim 1, wherein
the generating of the second characteristic transition is performed by
generating a base transition that is a transition of a voice acoustic characteristic corresponding to notes specified by musical score data,
generating a relative transition that corresponds to the specific pronunciation style and that is a transition of acoustic characteristic-relative values relative to the base transition, and
combining the base transition and the relative transition to generate the second characteristic transition.

17. The information processing device according to claim 8, wherein
to generate the second characteristic transition, the electronic controller is configured to
generate a base transition that is a transition of a voice acoustic characteristic corresponding to notes specified by musical score data,
generate a relative transition that corresponds to the specific pronunciation style and that is a transition of acoustic characteristic-relative values relative to the base transition, and
combine the base transition and the relative transition to generate the second characteristic transition.

18. The information processing method according to claim 1, wherein
the same acoustic characteristic is pitch or volume.

* * * * *